United States Patent
Elrabaa

(10) Patent No.: US 8,352,774 B2
(45) Date of Patent: Jan. 8, 2013

(54) INTER-CLOCK DOMAIN DATA TRANSFER FIFO CIRCUIT

(75) Inventor: Muhammad E. S. Elrabaa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 371 days.

(21) Appl. No.: 12/801,756

(22) Filed: Jun. 23, 2010

(65) Prior Publication Data

US 2011/0320854 A1 Dec. 29, 2011

(51) Int. Cl.
*G06F 1/04* (2006.01)
*G06F 1/12* (2006.01)
*G06F 5/06* (2006.01)

(52) U.S. Cl. ........................................ 713/600

(58) Field of Classification Search .................... 713/600
See application file for complete search history.

(56) References Cited

U.S. PATENT DOCUMENTS

| | | | |
|---|---|---|---|
| 5,951,635 A | 9/1999 | Kamgar | |
| 6,956,788 B1 | 10/2005 | Nguyen et al. | |
| 7,197,582 B2 | 3/2007 | Chelcea et al. | |
| 7,310,396 B1 | 12/2007 | Sabih | |
| 7,573,770 B1 | 8/2009 | Zhang et al. | |
| 2004/0128413 A1 | 7/2004 | Chelcea et al. | |
| 2006/0031619 A1* | 2/2006 | Nguyen et al. | 710/305 |
| 2006/0239392 A1 | 10/2006 | Cummings et al. | |
| 2007/0097771 A1* | 5/2007 | Chu et al. | 365/221 |
| 2008/0005402 A1* | 1/2008 | Kim et al. | 710/52 |

* cited by examiner

*Primary Examiner* — Mohammed Rehman
(74) *Attorney, Agent, or Firm* — Richard C. Litman

(57) ABSTRACT

The inter-clock domain data transfer FIFO circuit provides a circuit that transfers data between two clock domains of unrelated frequencies. The gate count is kept relatively low, thereby allowing data transfer between the two clock domains at one data item per cycle of the lower of the two frequencies. Depending on the frequency difference between the data producer and consumer, the initial latency could be as low as a fraction of a cycle and no more than two cycles of the consumer's clock. The operation of the data transfer FIFO circuit has been verified using gate-level simulations for several ratios of clock frequencies.

9 Claims, 6 Drawing Sheets

INTER-CLOCK DOMAIN DATA TRANSFER FIFO CIRCUIT

BACKGROUND OF THE INVENTION

1. Field of the Invention

The present invention generally relates to electronic data transfer devices, circuits, and methods, and more particularly to an inter-clock domain data transfer FIFO circuit for regulating the transfer of data between two clock domains of unrelated frequency.

2. Description of the Related Art

Currently, Systems-on-Chip (SoCs) are constructed using a wide range of pre-designed intellectual property modules (IPs) that are integrated together with a communication medium (typically a system bus). Each IP may have different clock and communication needs. This, coupled with the ever increasing demands on shorter time-to-market, necessitates developing efficient design flows that can achieve time closure of the whole SoC in a short time while satisfying the communication needs of its various components. Several SoC bus standards have been developed requiring either asynchronous or synchronous IP interfaces.

Due to the limitations of the aforementioned bus standards, a new, Networks-on-Chip (NoCs), interconnection paradigm has recently been proposed. NoCs are being explored as scalable interconnect architectures that can route data between SoC IPs over shared interconnects. Also, due to the difficulty of globally synchronizing SoC components, Globally Asynchronous Locally Synchronous (GALS) systems have emerged. GALS research aims at developing circuits, methodologies and models for interconnecting synchronous blocks with separate clock domains using asynchronous interconnects. Hence, NoCs can be viewed as a special case of GALS.

The data transfer rates and latencies of asynchronous interconnects are limited due to the required handshaking. It has been shown that the fastest asynchronous repeaters can, at best, only match the speed of synchronous repeaters. Loosely synchronous techniques with dedicated point-to-point connections require some form of a FIFO (First In, First Out) buffer between the transmitter and receiver to move data across their clock domains. Communication throughput and latency depends on the design of the FIFO, transmitter/receiver clock rates and communication patterns. A simple asynchronous FIFO would take at least three clock cycles of the slower of the two clocks to transfer a datum due to handshaking and synchronization between the two domains.

Several FIFO designs have been proposed to facilitate data transfer between two different clock domains. A self-timed FIFO for transferring data between two clock domains with arbitrary frequencies has been proposed. Such a FIFO would implement training circuitry to estimate the frequency difference between the two domains before data transfer can begin. From that point on, it requires that the clocks remain stable.

Synchronization is limited to what is considered as high-risk transfers. The circuit structure depends on which clock domain has the higher rate. Alternatively, a FIFO with a maximum throughput of one datum per clock cycle (of the slower of the two clocks) has been proposed. Both data and synchronization were pipelined alongside one another. This simple approach of implementing the FIFO as a pipeline greatly reduced the probability of failure due to metastability and eliminated the need for detecting full/empty conditions. However, it increased the latency of the interface, since the pipeline has to be filled first before data can come out of it. It also imposed the constraint that the sender and receiver had to operate at the same data rate.

Moreover, an approach for data transfer between different clock domains based on a general FIFO that allows the sender and receivers to put (or send) and get (or receive) data at their own clock rates simultaneously has been proposed. In addition to the need for elaborate circuitry for detecting empty/full FIFO conditions, more circuits were added to detect when the FIFO is nearly full or empty. These signals are necessary to maintain the data transfer rates while synchronizing the conventional empty/full signals. A point-to-point bidirectional link based on an asynchronous FIFO was proposed in which a datum transfer requires a minimum of three clock cycles (of the slower of the two clocks).

A FIFO-based on dual-port SRAM was proposed in which two address pointers are used to point to the beginning and end of the data in the FIFO. These pointers need to be conveyed from one clock domain to the other through synchronization. A configurable logic is used to reserve space in the FIFO to compensate for synchronization latency incurred in exchanging the address pointers between the two sides. Also, configurable delay blocks are used to control the skew of data and control signals on both sides of the FIFO, and to reserve space in the FIFO. While this implementation is well suited for large buffers, it has a complex design and significant latency.

None of the above devices taken either singly or in combination, is seen to describe the instant invention as claimed. Thus, an inter-clock domain data transfer FIFO circuit solving the aforementioned problems is desired.

SUMMARY OF THE INVENTION

The inter-clock domain data transfer FIFO circuit is a new circuit for transferring data between two clock domains of unrelated frequencies. With a relatively low gate count, it allows data transfer between the two clock domains at one data item per cycle of the lower of the two frequencies. Depending on the frequency difference between the data producer and the consumer, the initial latency could be as low as a fraction of a cycle, and no more than two cycles of the consumer's clock. The operation of this circuit has been verified using gate-level simulations for several ratios of clock frequencies.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
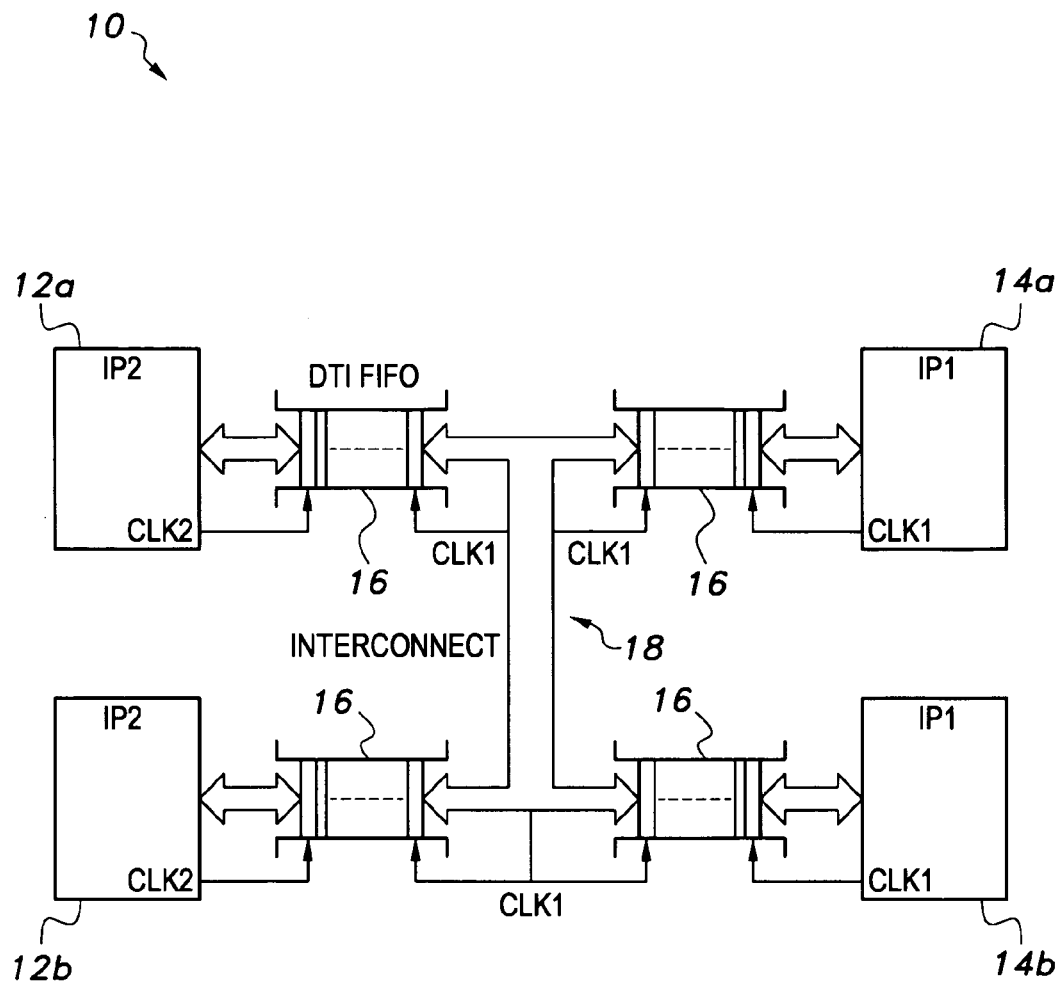
FIG. 1 is a schematic diagram of a polysynchronous Globally Asynchronous Locally Synchronous (GALS) system configuration using an inter-clock domain transfer FIFO circuit according to the present invention for data transfer between the IP modules.

Referring to FIG. 1, an exemplary polysynchronous Globally Asynchronous Locally Synchronous (GALS) system 10 includes a data transfer interface (DTI) circuit having DTI FIFOs (inter-clock domain transfer FIFO circuits) 16, which allow data transfer between a data client producer and an on-chip interconnection medium, such as a Network-on-Chip (NoC). As shown in FIG. 1, the polysynchronous GALS system 10, which includes a fully synchronous interconnect medium 18 running at its own independent clock ($CLK_I$), connects several arbitrarily and locally clocked IPs through the DTI FIFOs 16.

Each DTI FIFO 16 can be disposed within a polysynchronous system-on-chip (SoC) 10. A polysynchronous system represents an unrestricted form of a Globally Asynchronous Locally Synchronous System (GALS). Referring to the Intellectual Property modules (IP), upper IP module IP2 12a (interconnected with lower IP module IP2 12b) and upper IP module IP1 14a (interconnected with lower IP module IP1 14b) are each running at their own clock frequency. However, the interconnection medium 18 is synchronous with a clock that is separate from any of the IP clocks. Each of the IP modules 12a, 14a, 12b, and 14b exchanges data using their respective clocks through the communication medium 18, which may be, e.g., a simple point-to-point interconnection or a full, synchronous NoC.

Intellectual property modules (IPs) are still designed as fully synchronous entities with simple synchronous ports. Moreover, the communication medium itself is simply designed as a synchronous IP, thus computations are decoupled from communications, and maximum data throughputs can be achieved through synchronous pipelining of the interconnection medium 18. The DTI FIFO 16 facilitates IP data transfer in the system 10.

The DTI system 10 is bidirectional, and is comprised of two identical DTI FIFOs 16, in which each may transfer the data bi-directionally through the interconnect 18. The DTI FIFO design is simple, yet allows independent data writing and reading at different and unrelated rates. The main component of the DTI FIFO 16 is a simple 2-stage asynchronous pipeline having disparate clock domains. Data enters the pipeline from one clock domain and leaves the pipeline to the other clock domain.

Figure 2A:
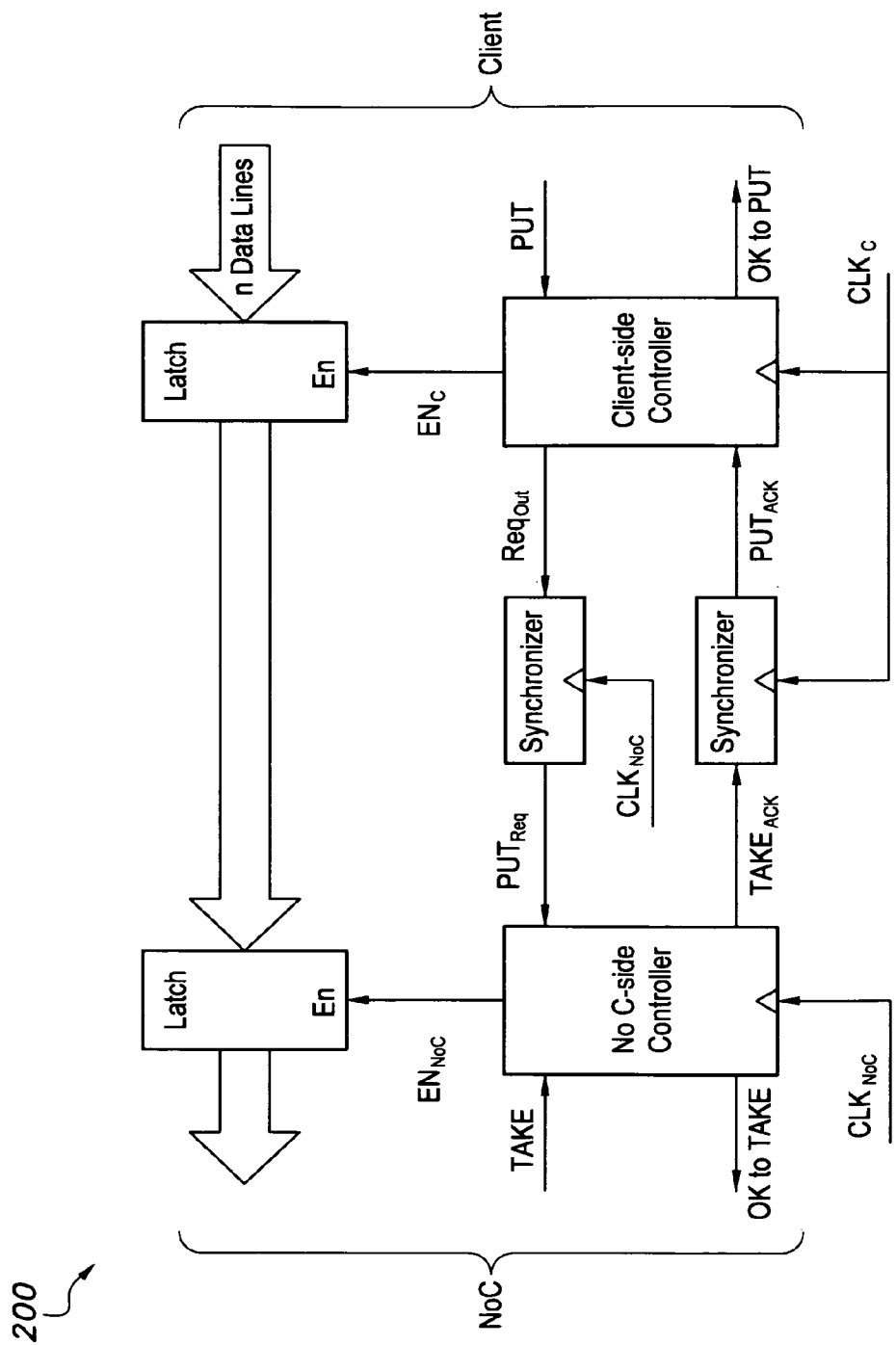
FIG. 2A is a block diagram of an asynchronous pipeline system for implementing an inter-clock domain transfer FIFO circuit according to the present invention.
Figure 2B:
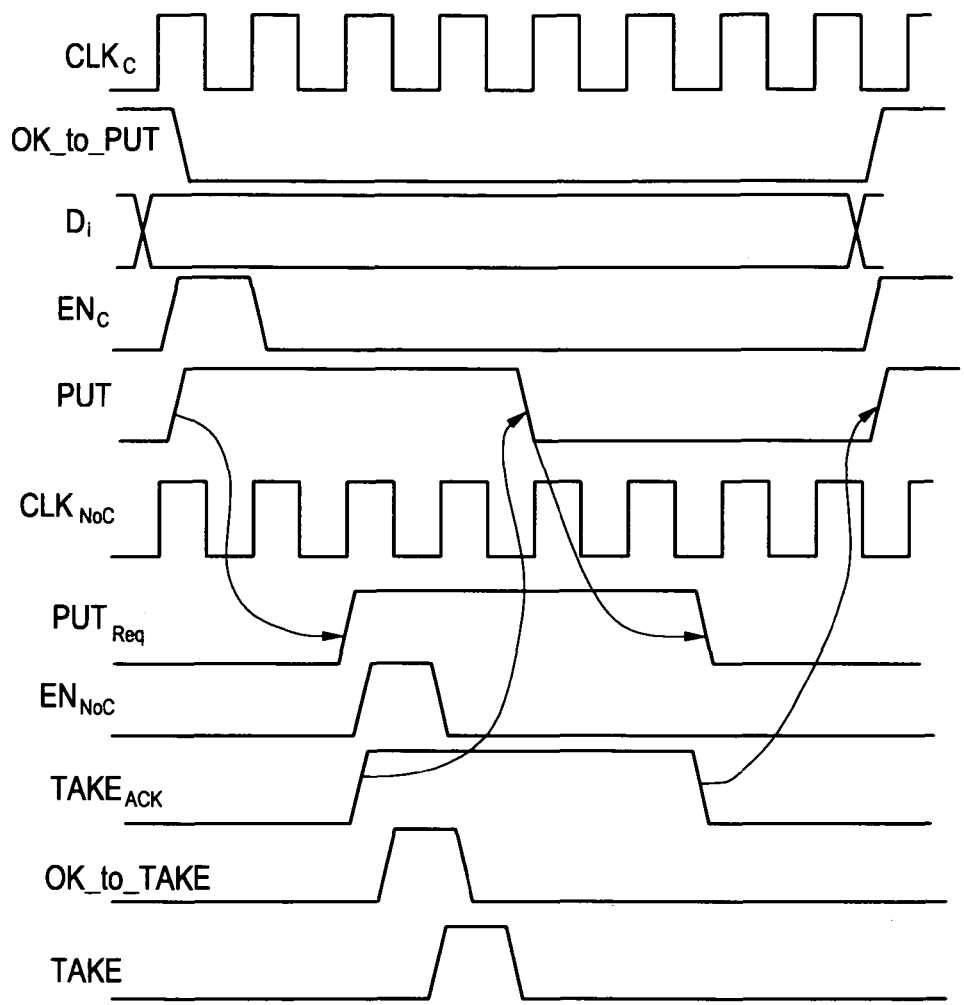
FIG. 2B is an exemplary waveform diagram showing the signaling protocol between two clock domains having the same clock frequency using the asynchronous pipeline system of FIG. 2A.

As shown in block diagram 200 of FIG. 2A and the exemplary signaling protocol waveforms 250 of FIG. 2B, the basic 2-stage asynchronous pipeline circuit for data transfer between two clock domains requires the signaling protocol of FIG. 2B to transfer data between a producer and a consumer. For the exemplary device, it is assumed that the producer is an IP (i.e., a client on the NoC) and the consumer is a NoC (as an interconnection medium). The same circuit/protocol would work equally correctly for a NoC as a producer and a client as a consumer.

In FIG. 2B, data transfer is illustrated for equal client and NoC clock frequencies ($CLK_C$ and $CLK_{NoC}$, respectively), which is the worst case condition in terms of the number of cycles required to complete a datum transfer. Client side and NoC side data latches are utilized. $EN_C$ and $EN_{NoC}$ are the latch enable signals for putting the data and getting the data.

A simple four-phase signaling protocol is used to simplify the circuit design. Each synchronizer is made of two D-type flip-flops. The client initiates the transfer by setting up the data and raising the PUT signal. The client-side controller strobes the latch ($EN_C$ high) and initiates a request signal ($Req_{Out}$). This signal would reach the NoC-side controller as $PUT_{Req}$ after two clock cycles (the synchronization delay).

If the previous data has been taken by the NoC (i.e., consumed, as indicated by a low OK_to_TAKE signal), the NoC-side controller would then strobe the NoC data latch, initiate an acknowledgement signal ($TAKE_{ACK}$) to go to the client-side controller, and set the OK_to_TAKE signal to indicate for the NoC that a data item is ready to be taken.

The $TAKE_{ACK}$ signal would reach the client-side controller after two more clock cycles, which, in turn, responds by deactivating the request signal. The NoC controller would then deactivate the acknowledge signal, completing the transfer in eight cycles. The OK_to_TAKE signal is reset when the NoC removes the data, indicated by setting the TAKE high.

If the client or the NoC have a higher clock frequency than the other, the transfer would take a fewer number of cycles (the minimum is four). The use of two latches (instead of a single latch or flip flop, as in most FIFOs) per cell greatly simplifies the design by decoupling the PUT (writing to the client's side latch) and GET (reading the NoC's side latch output) operations, and effectively provides a two-stage pipeline per FIFO stage, thereby reducing the impact of clock frequency difference on the PUT/GET rates.

The number of required transfer cycles could have been reduced by overlapping data transfers, but this would have resulted in more complex control circuitry that would be larger and slower to operate. A maximum throughput of one datum transfer per cycle with a latency of less than one cycle is still achieved by the present FIFO.

Figure 3A:
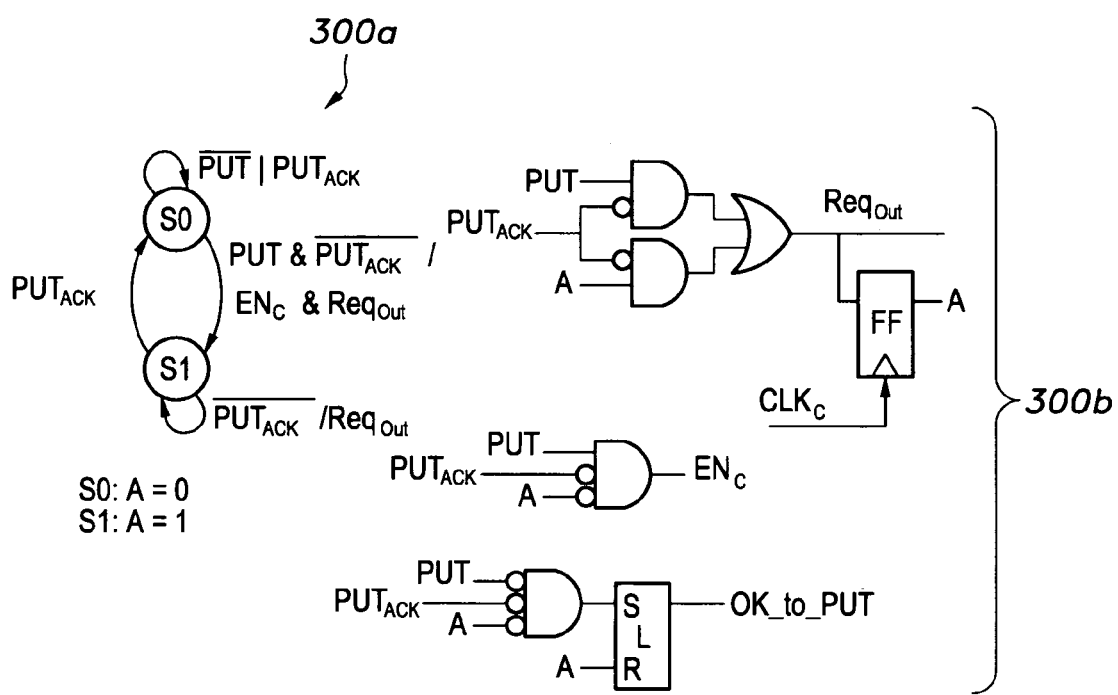
FIG. 3A is a schematic diagram (and corresponding state diagram) of an asynchronous pipeline circuit controller for the client (or data producer) side of an inter-clock domain transfer FIFO circuit according to the present invention.
Figure 3B:
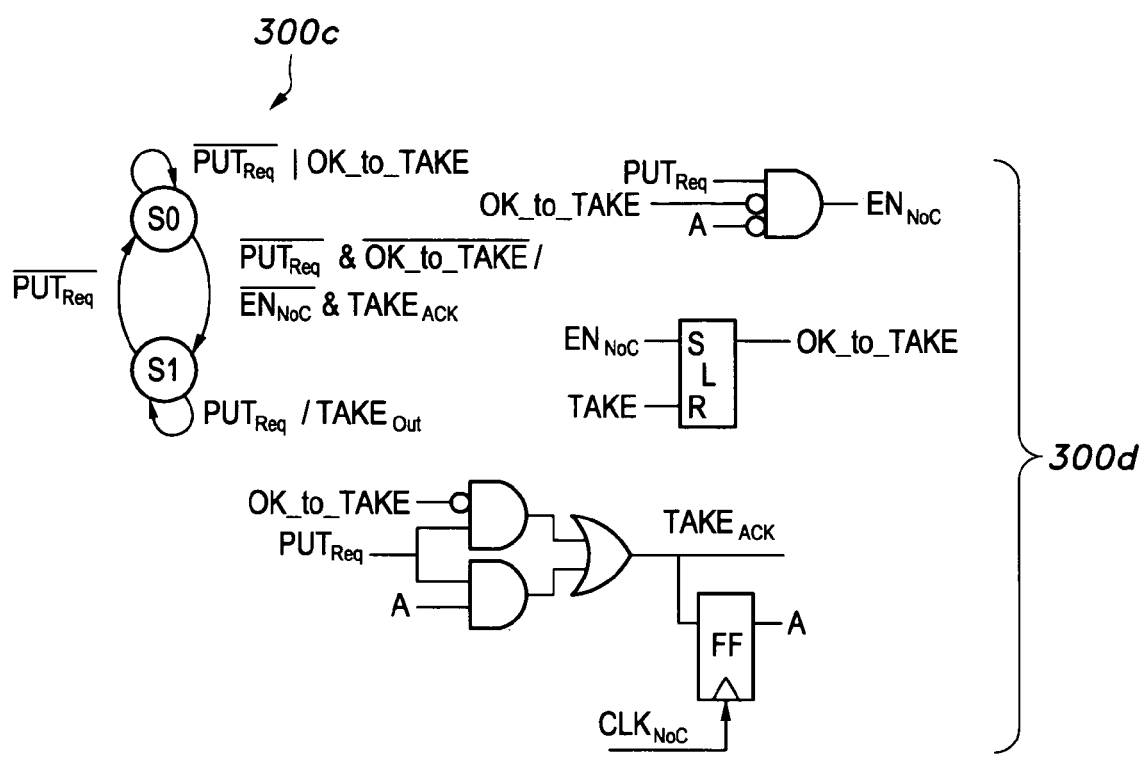
FIG. 3B is a schematic diagram (and corresponding state diagram) of an asynchronous pipeline circuit controller for the interconnection medium (NoC or consumer) side of an inter-clock domain transfer FIFO circuit according to the present invention.

FIGS. 3A and 3B show the design of the client/NoC controllers of the asynchronous pipeline. Both controller 300a and controller 300c are simple two-state finite state machines (FSMs), controller 300a being implemented with a single flip flop (FF) and simple logic circuit 300b, while controller 300c is implemented with a single flip flop (FF) and simple logic circuit 300d. If the client asserts the PUT signal while $PUT_{ACK}$ is low the controller would set both $EN_C$ and $Req_{Out}$ high, i.e., latch-in the data and transition to state S1. This transition resets the OK_to_PUT signal. The $Req_{Out}$ signal is kept high until the $PUT_{ACK}$ signal goes high, indicating that the NoC has received the data. The OK_to_PUT signal is then set when the $PUT_{ACK}$ signal goes back low. On the NoC-side, if the controller receives a put request (high $PUT_{Req}$) while OK_to_TAKE is low, it asserts both $EN_{NoC}$ and $TAKE_{ACK}$ high. $TAKE_{ACK}$ remains high until the client responds by lowering the $PUT_{Req}$ signal. After latching the data, the OK_to_TAKE signal is set high. The NoC consumes the data by asserting the TAKE signal, which, in turn, resets the OK_to_TAKE signal. SR_latches are used to generate the OK_to_PUT and OK_to_TAKE signals, which indicate whether the state of the asynchronous pipeline is empty or full, respectively.

Figure 4:
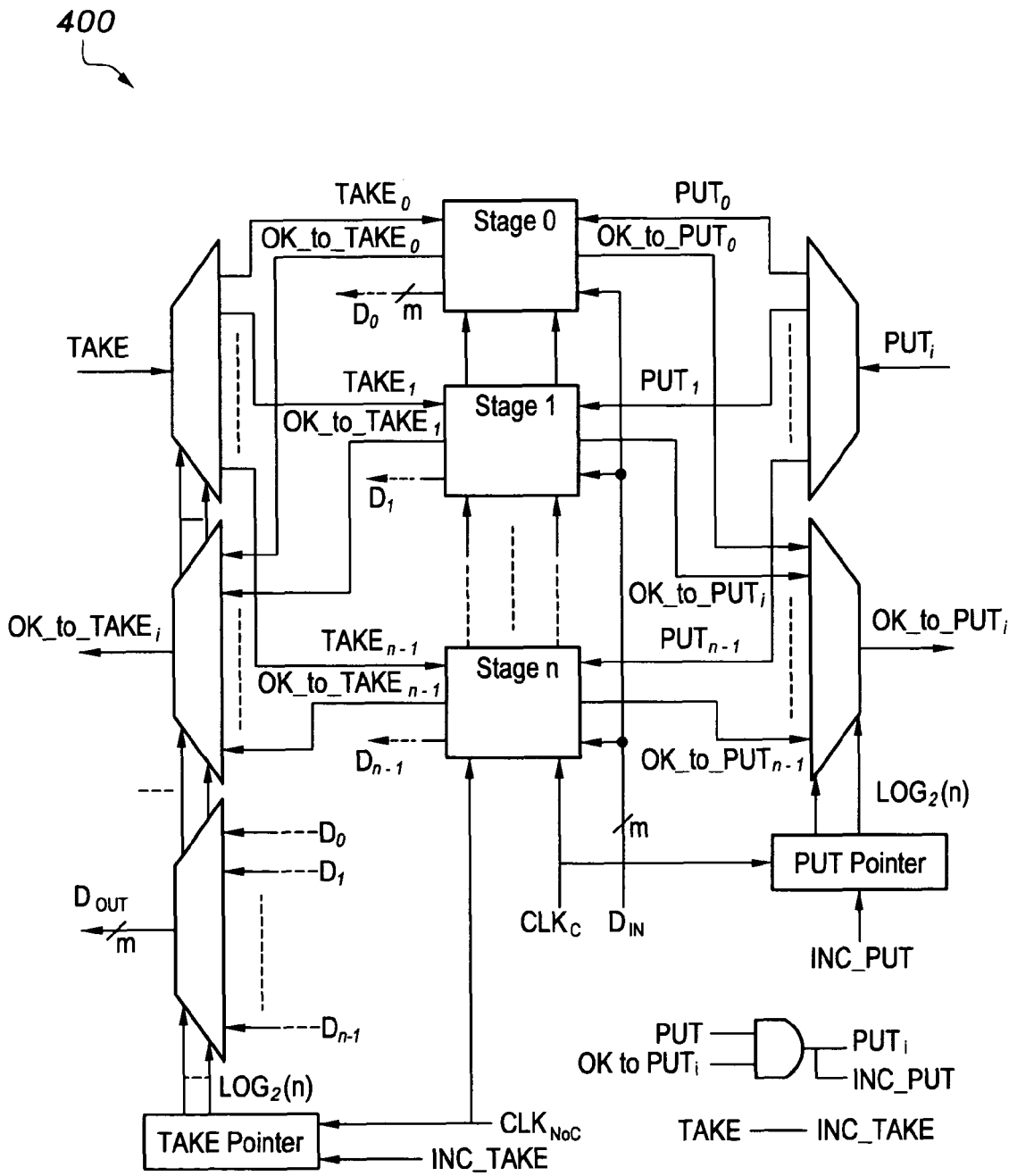
FIG. 4 is a block diagram of an n stage inter-clock domain transfer FIFO circuit according to the present invention.

FIG. 4 shows the block diagram 400 of an n stage FIFO constructed from the basic asynchronous pipeline 10 described above. Input data lines ($D_{IN}$) are connected to the inputs of all stages on the client side. Two counters are used as pointers to the tail of the PUT queue and the head of the TAKE queue. The OK_to_PUT signal of the stage selected by the PUT pointer is routed to the client through a multiplexer (MUX). Similarly the PUT request signal from the client is routed to the same stage through a MUX. For large FIFOs, the counter-MUX combination could be replaced by a combination of a ring-connected shift register containing one token pointing to the tail of the PUT queue and tri-state buffers. Thus, when the client issues a PUT request while the OK_to_PUT signal of the current stage is high, an internal put signal ($PUT_i$) is generated, routed to this stage, and the put pointer is incremented. The SR-latch in the FIFO stage used for the OK_to_PUT signal of the selected stage would reset after one clock cycle. Hence, the internal PUT signal would not evaporate before the end of the cycle. This allows the client to put a data item every cycle (of its own clock) as long as the FIFO is not full, indicated by the OK_to_PUT signal of the tail cell.

On the NoC side a datum is removed from the head of the queue selected by the TAKE pointer when a TAKE request is received while the corresponding OK_to_TAKE signal is high. The TAKE request also increments the TAKE pointer. As was explained above, depending on the two clock frequencies, it can take up to eight cycles to complete a datum transfer within a single stage. Hence, using eight stages for the FIFO ensures achieving the maximum data rate of one datum per clock cycle for any client/NoC clock frequencies.

To verify the operation of the DTI FIFO circuit, a gate-level implementation of an 8-stage FIFO was simulated (with unit gate delays) for three Client-to-NoC clock frequency ratios; 1:1, 1:2.5 and 2.5:1. Two additional circuits emulating the client and NoC were a data producer that would put a new datum whenever the OK_to_PUT signal is high, and a data consumer that would take data whenever the OK_to_TAKE is high. The results showed that for equal frequencies, both client and NoC are able to put/get a datum per clock cycle. When the NoC's clock frequency is 2.5× that of the client, the client is still able to put data every cycle, but the data removal rate by the NoC is automatically reduced by a factor of 2.5 of the NoC clock frequency. When the client's clock frequency is 2.5× that of the NoC, initially when the FIFO is empty, the client is able to put data at the maximum rate. The rate gradually goes down until it reaches 1/2.5 of the client's clock rate. The gradual reduction of the rate is because, for this clock ratio, it takes four NoC clock cycles to transfer a datum between the client-side latch to the NoC-side latch. Since the FIFO size is eight, there will be enough time for several stages to complete their data transfers. Moreover, the inherent pipelining within the stage due to the use of two latches will cause gradual reduction of the rate.

Table 1 below shows the break down of the gate count for the different components of the FIFO, where n represents the number of FIFO stages and m is the data width. Hence, the total gate count for an 8-bit, 8-stage FIFO is ~1250 gates, a remarkably low gate count for such a circuit.

TABLE I

Gate count breakdown

| Component | # of Gates |
| --- | --- |
| Controllers (within a FIFO stage) | 40 Gates/stage → 40 n gates |
| Latches (within a FIFO stage) | 2 m Latches/stage → 2 mn total → 8 mn gates |
| MUXs | 3 MUXs at n(m + 1) Gates/MUX → 3 n(m + 1) gates |
| DeMUXs | 2 DeMUXs at mn Gates/DeMUX → 2 mn gates |
| PUT/TAKE pointers | 12 $LOG_2(n)$/pointer → 24 $LOG_2(n)$ gates |
| Total | n (43 + 13 m) + 24 $LOG_2(n)$ gates |

The inter-clock domain data transfer FIFO circuit allows interconnecting locally synchronous on-chip blocks (IPs) through a fully synchronous interconnection medium with its own (unrelated) clock. With a relatively low gate count, it allows fully synchronous data communication between the two domains at the maximum rate of one datum per cycle of the lower frequency of the two, no matter what the frequency ratio between the two domains is. The correct operation of this circuit was verified with gate-level simulations.

It is to be understood that the present invention is not limited to the embodiment described above, but encompasses any and all embodiments within the scope of the following claims.

I claim:

1. An inter-clock domain data transfer FIFO circuit, comprising:
a globally asynchronous, locally synchronous system (GALS) having a scalable interconnect architecture between system on a chip (SoC) intellectual property modules (IPs);
means for routing data between the SoC IPs over shared interconnect portions of the scalable interconnect architecture;
means for transfer of data between IPs having disparate clock domains; and
a plurality of data transfer FIFOs disposed within a polysynchronous system-on-chip (SoC);
wherein the circuit comprises a plurality of two-stage asynchronous pipeline circuits, each of the two-stage asynchronous pipeline circuits having:
a NoC-side controller operably connected to a first latch;
a client-side controller operably connected to a second latch;
a NoC-to-client synchronizer disposed between the NoC-side and client-side controllers;
a client-to-NoC synchronizer disposed between the NoC-side and client-side controllers; and
a data transfer pipe between the first and second latches, the data transfer pipe transferring data from the client to the NoC, wherein the NoC side controller has a TAKE input accepting signals from the NoC, an OK to TAKE output sending a signal to the NoC, a TAKE ACKNOWLEDGE output sending a signal to a left transfer synchronizer, the left transfer synchronizer having a PUT ACKNOWLEDGE output sending a signal to the client-side controller, the client-side controller having an OK to PUT output sending a signal to the client and a PUT input accepting a signal from the client, the client-side controller having a Req Out output sending a signal to the left transfer synchronizer, the left transfer synchronizer having a PUT Req output sending a signal to the NoC-side controller, the first and second latches having enable inputs accepting EN NoC and EN C (client) outputs from the NoC-side controller and the client-side controller, respectively.

2. The inter-clock domain data transfer FIFO circuit according to claim 1, wherein said GALS is a Network on a Chip (NoC).

3. The inter-clock domain data transfer FIFO circuit according to claim 1, wherein said data transfer occurs at a rate of approximately one data item per cycle of a lowest of said disparate clock domains.

4. The inter-clock domain data transfer FIFO circuit according to claim 1, wherein a worst case initial data latency between producer and consumer IPs in an operation of said data transfer is approximately 2 cycles of said consumer IP's clock.

5. The inter-clock domain data transfer FIFO circuit according to claim 1, wherein said means for routing data over said shared interconnect includes means for running said shared interconnect via a clock having phase and frequency independent of said IP clocks.

6. The inter-clock domain data transfer FIFO circuit according to claim 1, further comprising:
- a first IP module having a first DTI FIFO connected to said interconnect medium, the first IP module having a first clock queuing data into the first DTI FIFO at a first clock rate;
- a second IP module having a second DTI FIFO connected to said interconnect medium, the second IP module having a second clock queuing data into the second DTI FIFO at a second clock rate;
- a third IP module having a third DTI FIFO connected to said interconnect medium, the third IP module having the first clock queuing data into the third DTI FIFO at the first clock rate;
- a fourth IP module having a fourth DTI FIFO connected to said interconnect medium, the fourth IP module having the second clock queuing data into the fourth DTI FIFO at the second clock rate; and
- wherein said interconnect medium has a third clock receiving the first, second, third, and fourth DTI FIFOs' data at an independent third clock rate.

7. The inter-clock domain data transfer FIFO circuit according to claim 1, further comprising a two-state finite state machine (FSM) having a logical configuration of PUT ACKNOWLEDGE, PUT, EN C and REQ OUT signals wherein a combination of high PUT and low PUT ACKNOWLEDGE signals or a combination of high EN C and high REQ OUT signals transition the two-state FSM from a first state to a second state, and a high PUT ACKNOWLEDGE signal transitions the FSM from the second state to the first state.

8. The inter-clock domain data transfer FIFO circuit according to claim 1, further comprising a two-state finite state machine (FSM) having a logical configuration of PUT REQ, EN NoC, TAKE ACK, and OK_to_TAKE signals wherein a combination of low PUT REQ and low OK_to_TAKE signals or low EN NoC and high TAKE ACK signals transition the two-state FSM from a first state to a second state, and a low PUT REQ signal transitions the FSM from the second state to the first state.

9. The inter-clock domain data transfer FIFO circuit according to claim 1, further comprising:
- a plurality of said two-stage asynchronous pipeline circuits operably connected in multiple stages;
- a PUT data multiplexer;
- a PUT data register;
- a TAKE data multiplexer;
- a PUT pointer connected to a last of the multiple stages, the PUT pointer indexing into the PUT data multiplexer controlling data to be queued into said data transfer FIFOs, the PUT pointer being incremented by an OK_to_PUT signal originating from the PUT data register when a client issues a PUT request; and
- a TAKE pointer connected to the last of said multiple stages, the TAKE pointer indexing into the TAKE data multiplexer controlling data to be received from said data transfer FIFOs, the TAKE pointer being incremented by a TAKE signal originating from said NoC while a corresponding OK_to_TAKE signal is high.

* * * * *